(No Model.)
G. E. TWAMBLEY.
TOE-WEIGHT.
No. 338,680. Patented Mar. 23, 1886.
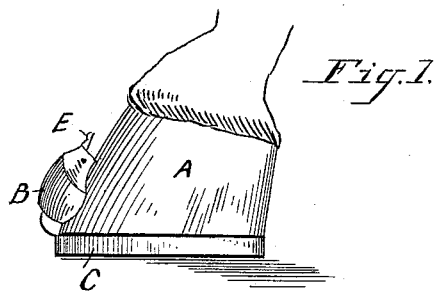
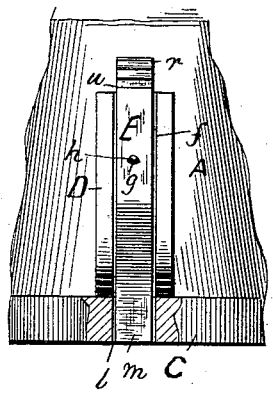
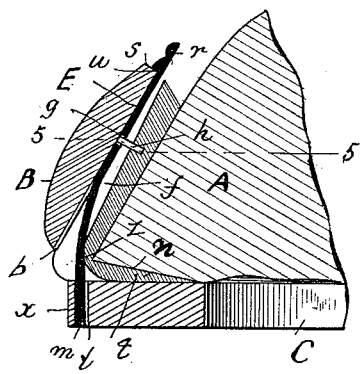
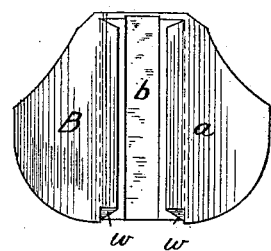
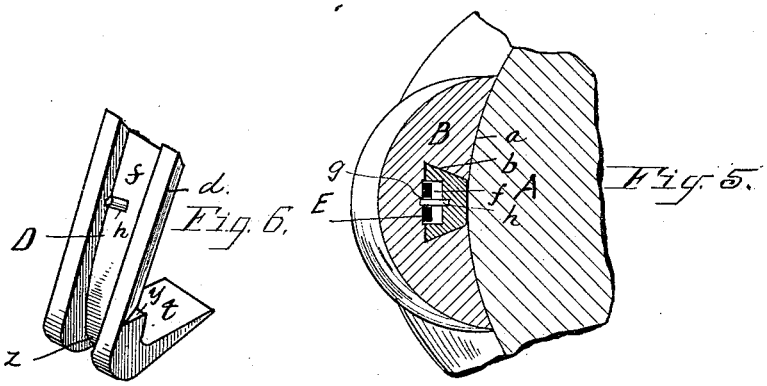
Witnesses
Wm. S. Bellows
Geo. K. Littlefield
Geo. E. Twambley
Inventor
per: Brown Bros.
Attorneys

UNITED STATES PATENT OFFICE.

GEORGE E. TWAMBLEY, OF SACO, MAINE.

TOE-WEIGHT.

SPECIFICATION forming part of Letters Patent No. 338,680, dated March 23, 1886.

Application filed April 23, 1885. Serial No. 163,173. (No model.)

*To all whom it may concern:*

Be it known that I, GEORGE E. TWAMBLEY, of Saco, in the county of York and State of Maine, have invented certain new and useful Improvements in Toe Weights, of which the following is a full, clear, and exact description.

This invention relates to improvements in the mode of securing toe-weights to hoofs of horses or other animals, and to the toe-weight described and shown in Letters Patent of the United States, issued to me, dated May 16, 1882, No. 257,907; and the invention consists of certain novel construction and arrangement of parts for the attachment of the toe-weight to the hoof of a horse, &c., all substantially as hereinafter fully described, reference being had to the accompanying plate of drawings, in which—

Figure 1 is a side view of a hoof of a horse with a toe-weight attached thereto in accordance with this invention. Fig. 2 is a front view, in detail, of a hoof with the weight removed with the attaching parts in front view. Fig. 3 is a detail vertical section of a hoof with the toe-weight and its attaching parts in place. Fig. 4 is a view of the back side of the toe-weight. Fig. 5 is a cross-section on line 5 5, Fig. 3; and Fig. 6 is a view in perspective of one of the attaching parts.

In the drawings, A represents a hoof of a horse or other animal, B the toe-weight, C the shoe, D the fastening-piece, and E the spring, all substantially as described and shown in said Letters Patent, except as to the present.

The toe-weight B is made of any suitable metal and of any shape or size. Its inner side, $a$, is concave, to correspond, substantially, with the convexity of the hoof, and at such side it has a longitudinal dovetail groove, $b$, in which is adapted to fit the upper part, $d$, of the fastening-piece D. This fastening-piece D has a longitudinal groove, $f$, on its front side of the part $d$, and a portion, $t$, extending back from the lower end of part $d$ in an angular direction, and which is wedge shape, as shown.

The spring E is made of a flat strip of metal, preferably of spring-steel, and it is bent substantially as shown, and it is adapted to loosely fit within the groove $f$ in the part $d$ of the fastening-piece. The spring has a hole, $g$, through its thickness, which, when the spring is within the groove $f$ in the fastening-piece, fits over a pin, $h$, secured in the portion $d$ of the fastening piece, and prevents longitudinal movement of the spring. The front of the shoe has an opening, $l$, through its thickness, of a size to freely receive the end $m$ of the spring.

To attach the toe-weight to the hoof, the hoof is first cut out at the front on its under side, at $n$, sufficiently for the portion $t$ of the fastening-piece D to be inserted therein and between it and the shoe. The fastening-piece is then placed in its position by inserting the portion $t$ within the groove $n$ and pressing it therein until its portion $d$ abuts against the hoof. Place the end $m$ of the spring E in the opening $l$ in the shoe, and its hole $g$ over the pin $h$ on the fastening-piece. Press the spring back at its upper end, $r$, so that the weight B can be placed over the upper end of the portion $d$ and moved down over the same until its upper end, $s$, is below the shoulder $u$ on the spring, when the spring by its tension will project its shoulder $u$ over the end of the weight and hold it from upward movement and consequent detachment from the hoof, its further downward movement being prevented by its lower end, $w$, abutting against and resting on the shoulder $y$ of the fastening-piece, lateral movement in any direction being prevented by its dovetail connection with the fastening-piece.

To remove the weight, press back the upper end, $r$, of the spring, releasing its shoulder $u$ from the weight, when the weight can be moved up and off the fastening-piece, which also releases the other parts so they can be easily removed. The spring is so formed and arranged by its bearing by its end on the side $x$ of the opening $l$ and against the lower end, $z$, of the groove $f$ that when all parts are attached to the hoof as described the tension of the spring caused by its being pressed back at its upper end will be in an outward direction, holding its shoulder $u$ firmly in place over the end of the weight and the weight securely to the hoof by its dovetail connection with the fastening-piece and the interlock of the fastening-piece with the hoof by its portion $t$. The pin $h$ can be on the spring and the hole $g$ in the fastening-piece, or any suitable shoulder or abutment connection can be made between the spring and fastening-piece to hold the spring in place thereon.

In lieu of making an opening, $l$, through the shoe, a shoulder or depression or a projection can be made in and on the shoe, against which the lower end of the spring can abut; but it is preferable to make the opening, which can extend wholly or only partially through its thickness.

The advantage of the present manner of attaching the weight over that shown in the patent referred to is, that the upward "projection" with its "lip" on the shoe described and shown in said patent is dispensed with in the present invention, and simply the opening made in the shoe, which is easily and conveniently made, and with the shoe on or off, and does not require any skilled workman, while the projection, with its lip, has to be made with the shoe off, and requires more care and skill, and is objectionable on the shoe.

Having thus described my invention, what I claim is—

1. The combination, with a horseshoe provided with an opening, $l$, for the reception of one end of a spring, E, of the fastening-piece D, having longitudinal groove $f$, the weight B, having dovetail groove $b$, and the spring E, interposed between the piece D and weight B, and means, substantially as described, for preventing longitudinal movement of the spring, all being constructed and combined substantially as set forth.

2. The combination, with a horseshoe provided with an opening for the reception of one end of a spring, E, of the fastening-piece D, having longitudinal groove $f$, the weight B, having dovetail groove $b$, the spring E, interposed between piece D and weight B and having opening $g$, and the pin $h$, secured to piece D, substantially as described.

In testimony whereof I have hereunto set my hand in the presence of two subscribing witnesses.

GEORGE E. TWAMBLEY.

Witnesses:
 EDWIN W. BROWN,
 WM. S. BELLOWS.